(12) United States Patent
Pinnekamp

(10) Patent No.: US 11,280,387 B2
(45) Date of Patent: Mar. 22, 2022

(54) POWER SHIFT TRANSMISSION

(71) Applicant: Renk Aktiengesellschaft, Augsburg (DE)

(72) Inventor: Burkhard Pinnekamp, Augsburg (DE)

(73) Assignee: RENK Aktiengesellschaft, Augsburg (DE)

( * ) Notice: Subject to any disclaimer, the term of this patent is extended or adjusted under 35 U.S.C. 154(b) by 0 days.

(21) Appl. No.: 16/709,432

(22) Filed: Dec. 10, 2019

(65) Prior Publication Data
US 2020/0191242 A1 Jun. 18, 2020

(30) Foreign Application Priority Data

Dec. 14, 2018 (DE) ...................... 10 2018 132 351.4

(51) Int. Cl.
*F16H 3/32* (2006.01)

(52) U.S. Cl.
CPC ....... *F16H 3/32* (2013.01); *F16H 2200/0034* (2013.01)

(58) Field of Classification Search
CPC ....... F16H 3/30; F16H 3/32; F16H 2200/0034
USPC ......... 74/321, 340, 341, 342, 344, 392, 664, 74/665 g, 665 ga, 665 gb, 665 gd
See application file for complete search history.

(56) References Cited

U.S. PATENT DOCUMENTS

| | | | | |
|---|---|---|---|---|
| 662,400 | A | * | 11/1900 | Dyer ......................... F16H 3/32 74/342 |
| 4,449,866 | A | * | 5/1984 | Lohneis ................... B23Q 5/14 408/124 |
| 4,726,260 | A | * | 2/1988 | Lovrenich .............. B23Q 5/147 408/9 |
| 5,862,705 | A | * | 1/1999 | Lee ......................... F16H 63/18 74/337.5 |

FOREIGN PATENT DOCUMENTS

DE    102009006118    8/2010

\* cited by examiner

*Primary Examiner* — Victor L MacArthur
(74) *Attorney, Agent, or Firm* — Cozen O'Connor

(57) ABSTRACT

A power shift transmission, having an input and an output shaft, rotatably and axially immovably mounted and a rotatably mounted intermediate shaft. The input shaft carries first and second gear wheels. The output shaft carries a third gear wheel. The intermediate shaft carries a fourth, fifth, and sixth gear wheels, which are movable such that in a first shifting position the first gear wheel is in engagement with the fourth gear wheel and the sixth gear wheel is in engagement with the third gear wheel, but the second gear wheel and the fifth gear wheel are out of engagement, and in a second shifting position, the second gear wheel is in engagement with the fifth gear wheel and the sixth gear wheel is in engagement with the third gear wheel, but the first gear wheel and the fourth gear wheel are out of engagement.

13 Claims, 2 Drawing Sheets

POWER SHIFT TRANSMISSION

BACKGROUND OF THE INVENTION

1. Field of the Invention

The invention relates to a power shift transmission.

2. Description of the Related Art

From DE 10 2009 006 118 A1 a heavy duty power shift transmission formed as a power split transmission is known. The heavy duty power shift transmission comprises an input shaft, an output shaft, and two intermediate shafts. Axially spaced apart from one another, the input shaft carries two gear wheels, which are referred to as drive pinions, wherein through axial movement of the input shaft different transmission stages can be engaged or different transmission stages can be shifted into. The axial moving of the input shaft also requires an axial moving of a drive flange coupled to the input shaft, which however is a disadvantage.

SUMMARY OF THE INVENTION

There is a need for a new type of power shift transmission, with which a change between the transmission stages is possible without axially moving the input shaft and thus a drive flange, and which at the same time does not require any shifting elements, for example dog clutches.

The power shift transmission according to one aspect of the invention comprises an input shaft, which is rotatably and axially immovably mounted and an output shaft, which is rotatably and axially immovably mounted.

The power shift transmission according to one aspect of the invention, furthermore, comprises an intermediate shaft, which is rotatably mounted.

That shaft of input shaft and output shaft, which during operation rotates faster than the other shaft of input shaft and output shaft, carries a first gear wheel and a second gear wheel. The shaft of input shaft and output shaft, which during the operation rotates more slowly than the other shaft of input shaft and output shaft, carries a third gear wheel.

The intermediate shaft carries a fourth gear wheel, a fifth gear wheel, and a sixth gear wheel, which are movable as a unit relative to the first and second gear wheel and the third gear wheel in such a manner that in a first shifting position, providing a first transmission stage, the first gear wheel is in engagement with the fourth gear wheel and the sixth gear wheel is in engagement with the third gear wheel, however the second gear wheel and the fifth gear wheel are out of engagement, and in a second shifting position, providing a second transmission stage, the second gear wheel is in engagement with the fifth gear wheel and the sixth gear wheel is in engagement with the third gear wheel but the first gear wheel and the fourth gear wheel are out of engagement.

With the power shift transmission according to one aspect of the invention, it is not required, for changing between transmission stages, to axially move the input shaft and thus a drive flange that is coupled to the input shaft. Furthermore, the power shift transmission does not require any shifting elements such as dog clutches.

The unit consisting of the fourth gear wheel, fifth gear wheel, and sixth gear wheel of the intermediate shaft can be moved axially both relative to the input shaft and also relative to the output shaft, in order to easily and reliably change between the transmission stages.

According to a first advantageous further development, the intermediate shaft is formed as a hollow shaft that is rotatably and axially movably mounted on an axle. According to an alternative second advantageous further development, the intermediate shaft is formed as a solid shaft that is rotatably and axially movably mounted in a transmission housing. Both these advantageous further developments are suitable to simply provide shiftability.

According to an advantageous further development of the invention, a gap is formed between the first gear wheel and the second gear wheel such that when the first gear wheel and the fourth gear wheel happen to be out of engagement, the second gear wheel and the fifth gear wheel are not yet in engagement. With this advantageous further development, a no-load position for the power shift transmission is provided.

According to an advantageous further development of the invention, a width of the sixth gear wheel is dependent on the axial movement path of the unit consisting of the fourth gear wheel, fifth gear wheel, and sixth gear wheel such that over the entire movement path of this unit the sixth gear wheel and the third gear wheel are in engagement. During the change between transmission stages, the sixth gear wheel is always in engagement with the third gear wheel. By way of this, the reliability during the change between the transmission stages can be increased.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

The invention relates to a power shift transmission which is embodied in particular as a heavy duty transmission such as an industrial transmission. Such a heavy duty transmission transmits a torque based on a slow-running shaft of at least 10 kNm, in particular of at least 50 kNm. The slow-running shaft can be both the input shaft and also the output shaft, typically the slow-running shaft of the heavy duty transmission is the output shaft. Such heavy duty transmissions are employed in different application cases such as for example as transmission for plants for the steel production and steel processing, in the plastics industry as transmission for extruders, as transmission for transport and conveyor systems for the open-cast industry, as transmission for cement mills, excavators, dredgers, or as transmission in plants for the power generation.

Figure 1:
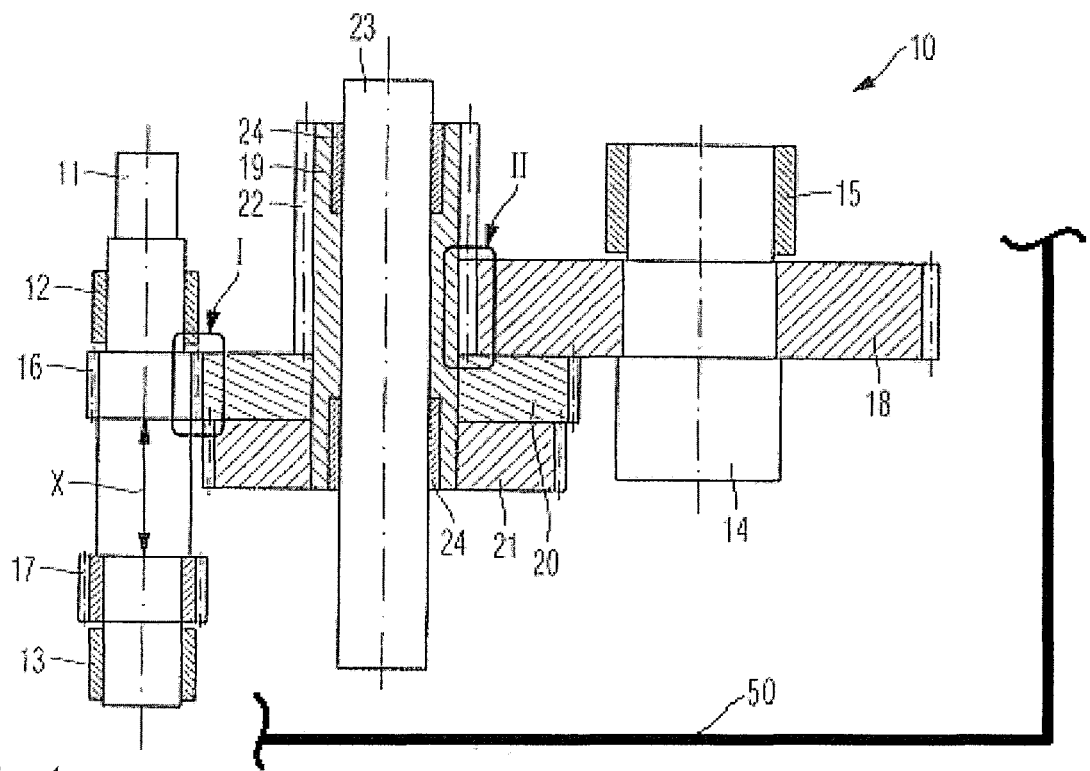
FIG. 1 is a power shift transmission in a first shifting state.
Figure 2:
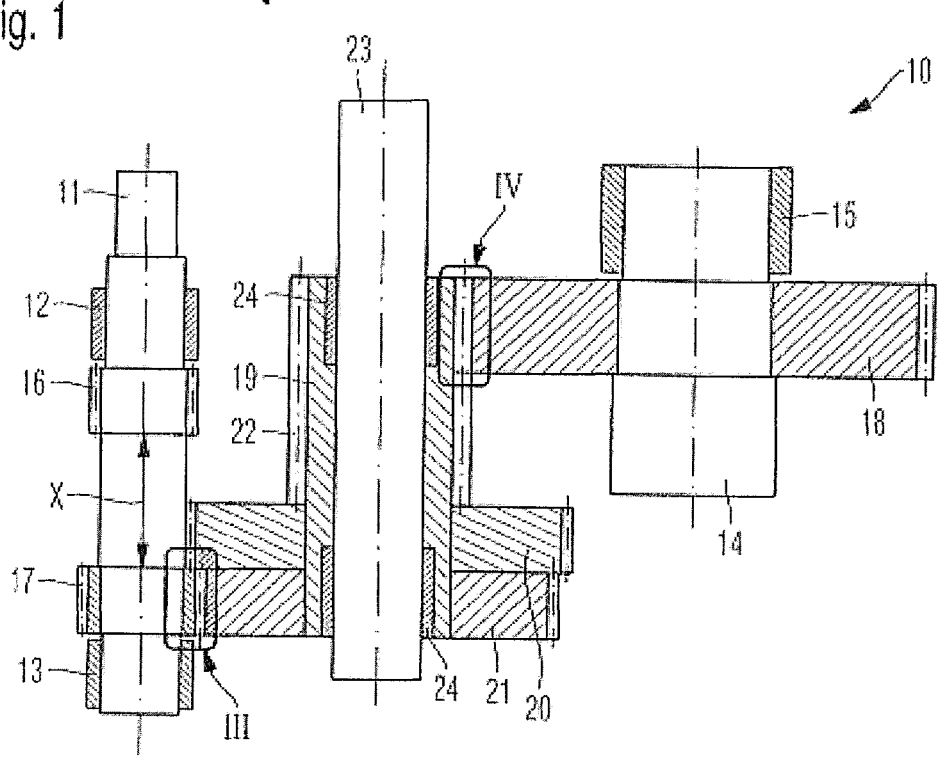
FIG. 2 is the power shift transmission in a second shifting state.

FIGS. 1 and 2 show a schematic representation of a first power shift transmission 10 according to one aspect of the invention.

The power shift transmission 10 of FIGS. 1 and 2 comprises an input shaft 11, arranged in a transmission housing to be rotatably and axially immovably mounted, namely by way of bearings 12, 13, which can be embodied as sliding bearings or as rolling bearings.

The power shift transmission 10, furthermore, comprises an output shaft 14, which is likewise rotatably and axially immovably mounted in the transmission housing, namely via a bearing 15 and further bearings, which in turn can be embodied as sliding bearings or as rolling bearings.

That shaft of input shaft 11 and output shaft 14, which during the operation rotates faster than the other shaft of input shaft 11 and output shaft 14, carries a first gear wheel 16 and a second gear wheel 17. That shaft of input shaft 11 and output shaft 12, which during the operation rotates more slowly than the other shaft of input shaft 11 and output shaft 12, carries a third gear wheel 18. In the exemplary embodiment of FIGS. 1 and 2, the faster-rotating shaft is the input shaft 11 and the slow-rotating shaft is the output shaft 14. Although this configuration is preferred, it can also be that the input shaft 11 is the slow-rotating shaft and the output shaft 14 is the faster-rotating shaft.

The power shift transmission 10 of FIGS. 1 and 2, furthermore, comprises an intermediate shaft 19. The intermediate shaft 19 carries a fourth gear wheel 20, a fifth gear wheel 21, and a sixth gear wheel 22. The fourth gear wheel 20, the fifth gear wheel 21, and the sixth gear wheel 22 form a unit and are movable as a unit relative to the first and second gear wheel 16, 17 and the third gear wheel 18, namely in such a manner that in a first shifting position (see FIG. 1), providing a first transmission stage, the first gear wheel 16 is in engagement with the fourth gear wheel 20 and the sixth gear wheel 22 is in engagement with the third gear wheel 18, but the second gear wheel 17 and the fifth gear wheel 21 are out of engagement, and that in a second shifting position (see FIG. 2), providing a second transmission stage, the second gear wheel 17 is in engagement with the fifth gear wheel 21 and the sixth gear wheel 22 is in engagement with the third gear wheel 18, but the first gear wheel 16 and the fourth gear wheel 20 are out of engagement. In this way, a power shift transmission with two transmission stages can be provided, in the case of which it is not necessary to axially move the input shaft 11. On the contrary, the transmission change is ensured through axially moving the unit consisting of the three gear wheels 20, 21 and 22, which are carried by the intermediate shaft 19.

In the exemplary embodiment of FIGS. 1 and 2, the intermediate shaft 19 is formed as a hollow shaft that is axially movably mounted on an axle 23 via bearings 24 formed as sliding bearings or rolling bearings. The axle 23, on which the intermediate shaft 19 formed as hollow shaft is axially movably mounted, is preferentially mounted or attached in the transmission housing 50, which is partially schematically shown.

In FIG. 1, a gear wheel engagement between the first gear wheel 16 and the fourth gear wheel 20 in the first shifting position of FIG. 1 is circled and marked with I and the gear wheel engagement between the sixth gear wheel 22 and the third gear wheel 18 in the shifting position of FIG. 1 is circled and marked with II.

In the shifting position of FIG. 2, the gear wheel engagement III and IV are circled and marked, namely the gear wheel engagement between the second gear wheel 17 and the fifth gear wheel 21 by III and the gear wheel engagement between the sixth gear wheel 22 and the third gear wheel 18 by IV.

The width of the sixth gear wheel 22 is dependent on the axial movement path of the unit consisting of the gear wheels 20, 21, and 22, namely in such a manner that, as shown in FIGS. 1 and 2, the sixth gear wheel 22 and the third gear wheel 18 are in engagement over the entire movement path of the unit consisting of the gear wheels 20, 21 and 22.

In the exemplary embodiment shown in FIGS. 1 and 2, an axial gap X between the first gear wheel 16 and the second gear wheel 17 is preferentially dimensioned such that in particular when the first gear wheel 16 and the fourth gear wheel 20 are out of engagement, the second gear wheel 17 and the fourth gear wheel 21 are not yet in engagement. By way of this, a no-load position for the transmission 10 can be provided.

Figure 3:
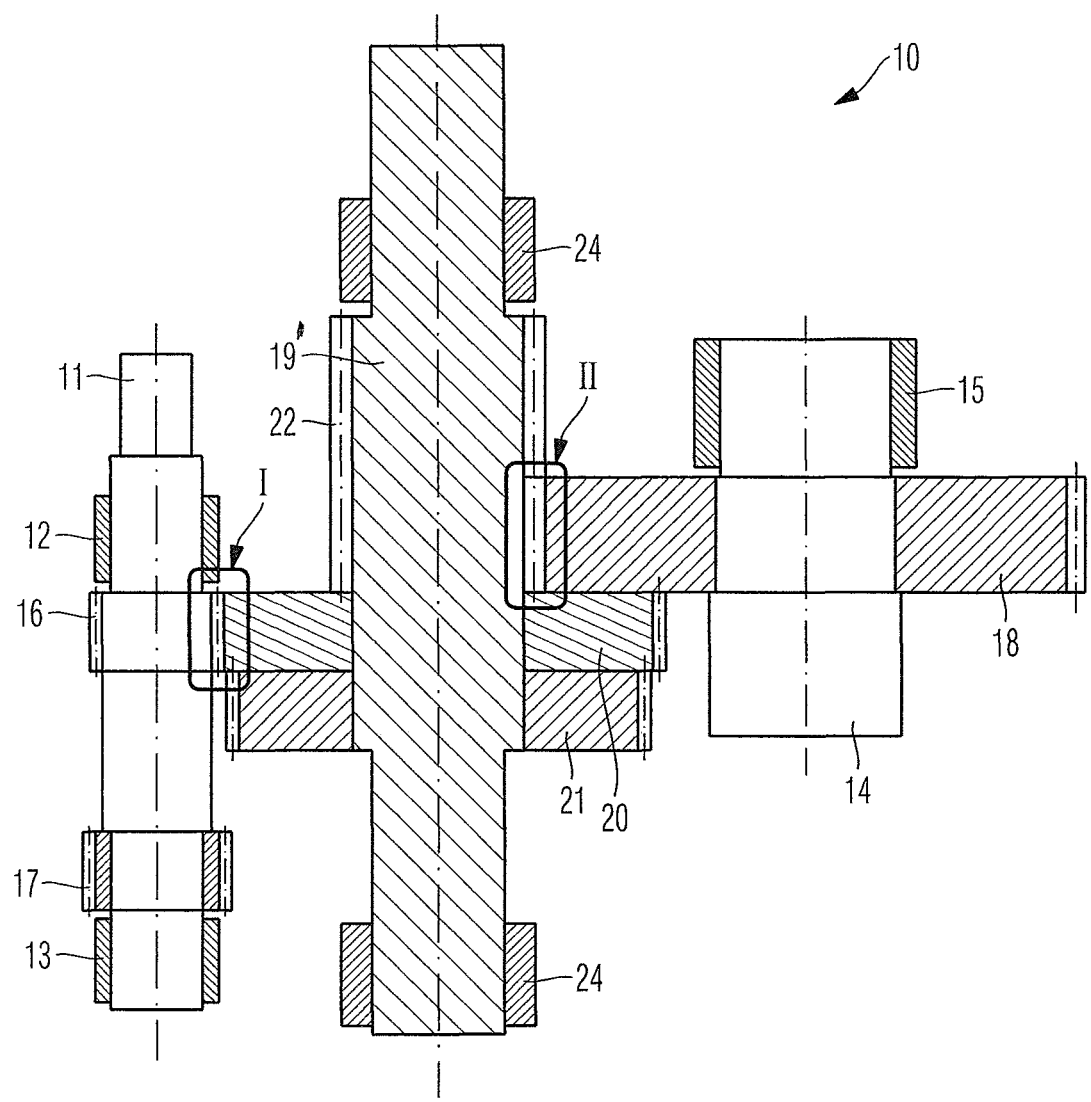
FIG. 3 is a diagram of a power shift transmission.

FIG. 3 shows a modification of the power shift transmission 10 of FIG. 1, 2, which differs from the exemplary embodiment of FIG. 1, 2 merely in that the intermediate shaft 19 is not formed as a hollow shaft that is axially movable on an axle 23, but the intermediate shaft 19 is embodied as solid shaft in FIG. 3, which in its entirety together with the gear wheels 20, 21 and 22 carried by the same, can be axially moved in order to shift between the different transmission stages. For this reason, to avoid unnecessary repetitions, same reference numbers are used for same assemblies and reference is made to the explanations regarding the exemplary embodiment of FIGS. 1 and 2. In the exemplary embodiment of FIG. 3, the intermediate shaft 19, formed as solid shaft is rotatably and axially movably mounted in the transmission housing via the bearings 24. Here, these bearings can be embodied as rolling bearings or sliding bearings.

The gear wheels 16, 17, 18, 20, 21 and 22 described above can be embodied as straight-cut or helical-cut gear wheels. An inclination angle in the case of helical-cut gear wheels is preferentially selected in such a manner that a resulting axial force on the intermediate shaft 19 is as low as possible.

One aspect of the invention proposes a power shift transmission with two transmission stages of simple design. The power shift transmission 10 comprises the input shaft 11 and the output shaft 14, wherein one of these shafts 11, 14 during the operation rotates more slowly than the other of these shafts 11, 14.

The faster-rotating shaft of these shafts 11, 14 is assigned two gear wheels 16, 17. The more slowly rotating shaft of these shafts 11, 12 is assigned a single gear wheel 18.

The intermediate shaft 19, which carries three gear wheels 20, 21 and 22, interacts with these two shafts, i.e. the input shaft 11 and the output shaft 14, which are each rotatably but axially immovably mounted.

Here, one of the gear wheels 20, 21 of the intermediate shaft 19 is in engagement, depending on the shifting position, with one of the gear wheels 16, 17 of the faster-rotating shaft, here the input shaft 11.

The gear wheel 22 of the intermediate shaft 19 is permanently in engagement with the gear wheel 18 of the more slowly rotating shaft, here the output shaft 14.

This embodiment of the transmission 10 is simple in design and allows a secure change between the transmission stages of the same.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A power shift transmission, comprising:
   a first shaft that is rotatably mounted and axially immovably mounted;
   a second shaft that is rotatably mounted and axially immovably mounted and configured to rotate slower than the first shaft;
   an intermediate shaft that is rotatably mounted;
   a first gear wheel and a second gear wheel arranged on the first shaft;
   a third gear wheel arranged on the second shaft;
   a fourth gear wheel, a fifth gear wheel, and a sixth gear wheel arranged on the intermediate shaft and configured to move as a unit relative to the first gear wheel and second gear wheel and the third gear wheel;
   wherein in a first shifting position providing a first transmission stage:
      the first gear wheel is in engagement with the fourth gear wheel;
      the sixth gear wheel is in engagement with the third gear wheel; and
      the second gear wheel and the fifth gear wheel are out of engagement,
   wherein in a second shifting position providing a second transmission stage:
      the second gear wheel is in engagement with the fifth gear wheel;
      the sixth gear wheel is in engagement with the third gear wheel; and
      the first gear wheel and the fourth gear wheel are out of engagement,
   wherein at least one of the first and the second shaft transmits a torque of at least 10 kNm,
   wherein a gap is formed between the first gear wheel and the second gear wheel, such that when the first gear wheel and the fourth gear wheel are out of engagement, the second gear wheel and the fifth gear wheel are not yet in engagement,
   wherein the first and second gear positions are consecutive without any other gear wheels therebetween.

2. The power shift transmission according to claim 1, wherein the intermediate shaft is a hollow shaft which is rotatably mounted and axially movably mounted on an axle.

3. The power shift transmission according to claim 1, wherein the intermediate shaft is a solid shaft which is rotatably mounted and axially movably mounted in a transmission housing.

4. The power shift transmission according to claim 1, wherein the first shaft and the second shaft are rotatably mounted and axially immovably mounted in a transmission housing.

5. The power shift transmission according to claim 1, wherein the intermediate shaft is mounted via one of a sliding bearing mounting and a rolling bearing mounting.

6. The power shift transmission according to claim 1, wherein a width of the sixth gear wheel is based on an axial movement path of the unit comprising the fourth gear wheel, the fifth gear wheel, and the sixth gear wheel, and
wherein over an entire movement path of the unit the sixth gear wheel and the third gear wheel are in engagement.

7. The power shift transmission according to claim 1, wherein each of the gear wheels is formed as a straight-cut spur gear.

8. The power shift transmission according to claim 1, wherein each of the gear wheels is formed as a helical-cut spur gear.

9. The power shift transmission according to claim 1, wherein the power shift transmission is an industrial transmission.

10. The power shift transmission according to claim 1, wherein respective mating gear wheels are formed as one of straight-cut spur gears and helical-cut spur gears.

11. The power shift transmission according to claim 1, wherein at least one of the first and the second shaft transmits a torque of at least 50 kNm.

12. The power shift transmission according to claim 1, wherein during shifting, when the gears are out of engagement, the first shaft is decoupled from the axially movable intermediate shaft.

13. The power shift transmission according to claim 12, wherein, the first shaft is decoupled from the axially movable intermediate shaft in an idle position of the power shift transmission.

* * * * *